Figure 1:
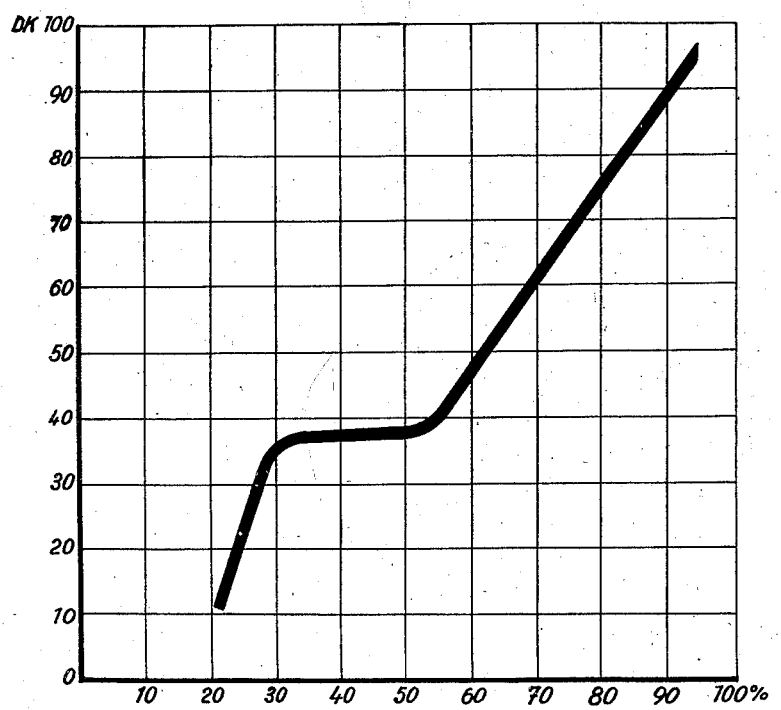

Dec. 9, 1947.                    W. RATH                        2,432,250
                        ELECTRICAL INSULATING BODY
                        Filed Oct. 26, 1939          2 Sheets-Sheet 1

Inventor
WERNER RATH
By
Attorney

Patented Dec. 9, 1947

2,432,250

UNITED STATES PATENT OFFICE 2,432,250

ELECTRICAL INSULATING BODY

Werner Rath, Bad Klosterlausnitz, Germany; vested in the Attorney General of the United States Application October 26, 1939, Serial No. 301,323
In Germany November 7, 1938

2 Claims. (Cl. 106—39)

My invention relates to an electrical insulating body of a titanium containing material, to electrical elements consisting of such materials and to the manufacture of the material and of said elements.

It is common practice to use ceramic material containing titanium dioxide for the manufacture of insulating bodies, more particularly of condensers, as titanium dioxide is characterized by a high dielectric constant. For the use of ceramic insulating bodies for high frequency purposes it is also desirable that the materials should have a low dielectric loss. Another requirement of increasing importance is that the dielectrical material should have a dielectric coefficient varying as little as possible with the change of the temperature. This is important for the production of oscillating circuits independent of the temperature. Numerous ceramic materials containing titanium dioxide have been developed for these purposes having qualities meeting the requirements of any particular use.

Sometimes certain qualities of a product of a desirable nature, for instance, independence of the dielectric coefficient of changes in temperature, must be purchased at the cost of other qualities of an undesirable nature, for instance at the cost of only moderate dielectric constant. The object of the invention is the manufacture of electrical insulating bodies which are suitable for use as a condenser dielectric and in which the desirable properties are incorporated to an extent surpassing any limits attainable heretofore. A more particular object of my invention is the manufacture of a ceramic material comprising a densely sintered mixture of titanium dioxide and oxides of the so called trivalent rare earths particularly of lanthanum oxide and/or oxides of the other rare earth elements accompanying the lanthanum in the main lanthanum containing minerals. Viewed from another aspect it is an object of the invention to create a new possibility of utilizing certain waste materials which are produced in the operation on minerals of the rare earths and heretofore could not be used economically.

As above explained, ceramic dielectrics have been manufactured of materials containing titanium dioxide and having, due to the content of titanium dioxide, a dielectric constant (DC) which is large compared with other ceramic materials so that the dimensions of condensers of a given capacity made of such dielectrics could be considerably reduced. Thus materials have been produced, for instance, containing in addition to titanium dioxide substantially china clay (kaoline), soapstone or certain refractory oxides such as magnesium oxide or beryllium oxide and having a high dielectric constant. In the high frequency art, however, only a limited number of such materials containing titanium dioxide could be used, to wit such materials of this kind which have low dielectric losses. Only a very limited number of such materials were known. Of the materials containing magnesium oxide and titanium dioxide, those having an extremely low loss had always a comparatively small DC. This is particularly undesirable as the DC varies but very little in such compounds with increasing content of titanium dioxide, increasing for instance from 12 to 18, when the content of titanium dioxide rises from 18 per cent to 79 per cent.

I have found that compounds of this kind can be considerably improved by the admixture to the titanium dioxide of the trivalent rare earths, e. g. of lanthanum and its naturally accompanying rare earths and of yttrium earths. The admixture to the titanium dioxide of oxides of these earths results in ceramic materials having a high DC and extremely low dielectric loss. The crude lanthanum oxide available on the market which contains

| | Per cent |
|---|---|
| Lanthanum oxide | 50–70 |
| Neodymium oxide | 20–40 |
| Praseodymium oxide | 3–10 | and small proportions of other rare earths when added to titanium dioxide results in a ceramic material having any desirable DC of from 10 to 100 depending on the proportion of the mixture and having a dielectric loss angle varying from 1 times $10^{-4}$ to 5 times $10^{-4}$. The same result is obtained by the mixture of titanium dioxide with the crude yttrium oxide available on the market which contains 75 per cent yttrium oxide.

As lanthanum oxide and the other rare earths are a waste material obtained in the treatment of monazite sand and as it was not possible before to use this waste material for any economical purpose the present invention will materially enhance the economy of the process of obtaining rare earths from monazite sand.

Of particular importance for the utility of the ceramic materials manufactured from rare earths and titanium oxide and for the adaptability to various requirements arising in different cases is the fact that the content of the rare earths in the densely sintered mixture may attain a comparatively high proportion without in any way adversely affecting the density of the sintered product, as in the case for instance with mixtures of titanium dioxide and zirconium dioxide which likewise have a high DC and a low angle of loss. In contradistinction to the mixtures containing trivalent rare earths, zirconium containing mixtures will ordinarily result in a dense product and in a low angle of loss only if the content of zirconium dioxide is small and if the content of titanium dioxide is high, whereas a higher proportion of zirconium will result in difficulties if it be attempted to attain a material having a DC of 20 to 50, a low angle of loss and a high density. If the content of the zirconium oxide exceeds 16 per cent, the material will not result in a dense product but will tend to form a coarse crystalline structure of a limited strength and of a porous nature having a comparatively high angle of loss. These difficulties are not met with if trivalent rare earths are used in place of zirconium oxide so that, in this event, materials having a DC from 20 to 50 and a low angle of loss may be produced. At the same time such properties of the mixture as are desirable for the ceramic process may be insured by the admixture of clay and/or soapstone as will be explained hereinafter by reference to specific examples.

I have mentioned hereinabove that for the materials used in the high frequency art, for instance for the provision of electrical oscillating circuits, it is often desirable that the temperature coefficient (TC) of the dielectric constant, and thereby the changes in the capacity of a condenser having a dielectric formed of the ceramic material occasioned by changes of the temperature, can be controlled within wide limits and that, if desired, the independency of the dielectric constant from the temperature may be more or less attained by a suitable choice of the constituents and the proportions of mixture of the same. This problem has led for instance to the development of a series of materials having a content of titanium dioxide so proportioned that their TC is either negative to a certain extent for the compensation of variations produced by fluctuations of the temperature of the elements of an oscillating circuit, or may approach zero more or less from the positive or the negative side for producing thermal independency of the circuit element.

Let it be assumed for example, that for such purpose the TC of an electrical insulating body shall have a value of from $-100.10^{-6}$ to $+100.10^{-6}$. This means that the capacity of a condenser of this material shall increase or decrease not more than $100.10^{-6}$ when the temperature varies one centigrade degree in the temperature range between 20° and 60° C. The prior ceramic materials meeting this requirement have a DC from 6 to 20. This applies, for instance, to the ceramic materials available on the market and applies equally to corresponding materials containing beryllium oxide. Hence, it will be seen that a more or less considerable independence of temperature can be obtained only with a comparatively small dielectric constant.

Compared with this prior art my improved ceramic materials containing titanium dioxide and trivalent rare earths represent a considerable improvement as a TC varying between $+100.10^{-6}$ and $-100.10^{-6}$ is combined with a considerably higher dielectric constant such as a constant of from 35 to 42 obtainable with a mixture of titanium dioxide and lanthanum oxide and the earths accompanying the same. Owing to the higher DC the dimensions of electrical elements produced therefrom may be considerably reduced, as will be readily understood. This advantage of the titanium containing masses produced with the aid of rare earths with regard to the increased DC compared with known materials having the same TC extends far into the region of the negative TC for instance up to $-500.10^{-6}$, that is to say into the region in which a high DC and a somewhat higher negative TC are desired, for instance for compensating purposes in oscillating circuits. Also in this region my improved materials are superior to all other known materials containing titanium dioxide.

This superiority of my improved materials over those available on the market prior to my invention will become apparent from a consideration of the fact that the prior materials having a DC of a sufficient value were invariably characterized by an excessive negative TC, whereas my improved materials having the same DC are characterized by a TC much more approaching the positive side or zero, respectively. Moreover, the angle of the dielectric loss of my improved materials, when used as a dielectric in an electrical high frequency field, is very low, in fact as low as such titanium dioxide containing ceramic masses only having an admixture of magnesium titanate. These known materials, however, have a comparatively limited DC. From the foregoing it will be understood that my improved condenser material is a valuable advance in the high frequency art as it results in condensers of a compact structure because of its high DC, and of constant capacity under variable temperatures because of its small TC, oscillating circuits including these condensers having a high selectivity and a low loss owing to the small dielectric angle of loss. The most valuable materials are believed those having a DC of 32 to 45, particularly of from 34 to 41 and TC of from $+100.10^{-6}$ to $-150.10^{-6}$ depending on the particular composition and manufacture and having an angle of dielectric loss of tan $d$ of from $1.10^{-4}$ to $2.10^{-4}$. However, those materials having a higher DC because of a small proportion of oxide of lanthanum and/or said equivalent rare earth metal oxides may also serve a useful purpose because of their low angle of loss in such cases where a higher negative TC is permissible. In the manufacture of ordinary ceramic materials the cost of the raw material is negligible compared with the cost of manufacture. That is different with my improved materials as the cost of the finished product depends under certain conditions largely on the cost of said rare earth oxides. In the manufacture of high frequency condensers, however, the use of expensive materials is economical for such purposes where superior qualities of the product are demanded. As the ceramic industry is able to produce tubular condenser bodies for instance having a thickness of but one hundredth of an inch and as the capacity of a condenser is inversely proportional to the thickness of the dielectric, the ceramic work pieces for the manufacture of condensers of a high capacity are small and have a limited weight and, therefore, can be manufactured at a low cost in mass production. In the high frequency industry, a dielectric material characterized by a slightly negative or slightly positive TC is urgently needed, as there is an increasing demand for compensated condensers and oscillating circuits adjusted for a predetermined dependency on the temperature.

My invention is also applicable to larger condensers of an extremely high capacity having the shape of plates, cups, flanged cylinders, receptacles or the like, as in these cases the use of a substantially more expensive material than used heretofore may be quite economical, for instance because the higher DC of my improved materials compared with that of magnesium silicate materials having a DC of 6.5 renders it possible to substitute a single plate of my improved material having a DC of about 40 for 6 plates of the prior steatite materials. In many cases the saving in space amounts to a substantial advantage justifying a higher cost of the material.

It is an important fact that a comparatively inexpensive lanthanum oxide of limited purity is available on the market for the present purpose. This material contains 26 to 30 per cent $Nd_2O_3$ and about 5.5 per cent $Pr_2O_3$ whereas a lanthanum oxide having a purity of 90 per cent would be less useful as it is less durable. A high proportion of cerium oxide in the material is detrimental.

I may state that, particularly for the purpose of making a dielectric having a DC substantially independent of changes in temperature, the use of lanthanum oxide results in a durable material only if neodymium and praseodymium are present at the same time in the above stated proportions. Pure or substantially pure lanthanum oxide is unsuitable because it is more expensive to produce and because it is not durable. Lanthanum oxide in itself results in durable bodies only if other oxides reducing the dielectric constant, such as magnesium oxide and beryllium oxide, are present in sufficient proportions.

Similar considerations apply to the use of the pure oxide of the rare earth elements related to lanthanum, for instance of neodymium oxide. The use of these materials is impractical compared with the use of lanthanum oxide not separated from its accompanying earths, since these other pure oxides are not sufficiently available on the market and are so expensive as to preclude an economic use thereof.

The durability of the new product particularly under the influence of water, has been extensively tested and found to be satisfactory. This applies particularly to materials containing less than 75 per cent of an oxide marketed in Germany by the Auer-Gesellschaft, Oranienburg. The chemical, mechanical and dielectric properties of said material justify the conclusion that the sintered material contains at least two compounds, to wit $3La_2O_3.2TiO_2$ and $La_2O_3.4TiO_2$ and mixed crystals of these two compounds.

To the ceramic material I may add clay, MgO, BeO and/or $ZrO_2$ and have found that these additions have satisfactory results, particularly with materials having a DC of from 20 to 45. The addition of these materials facilitates the manufacture and is apt to reduce straying of the TC and DC and to enhance the chemical durability of the material. Straying of the above values has been observed in my improved materials as well as in the prior condenser materials. The materials containing these additions have a quite satisfactory angle of loss and a TC which is more negative or less positive than in the absence of these additions.

Hereinafter I shall disclose a number of materials manufactured in accordance with my invention stating their composition, the process of their manufacture and their properties. The properties of the most important materials containing commercial lanthanum oxide including didymium (neodymium and praseodymium) oxide, will appear from the attached drawing in which Fig. 1 is a diagram illustrating the relationship existing between the dielectric coefficient of the lanthanum material and the proportion of titanium dioxide thereof, while Fig. 2 illustrates the relationship of the temperature coefficient of my new materials and also of certain known materials and their dielectric coefficient.

Figure 2:
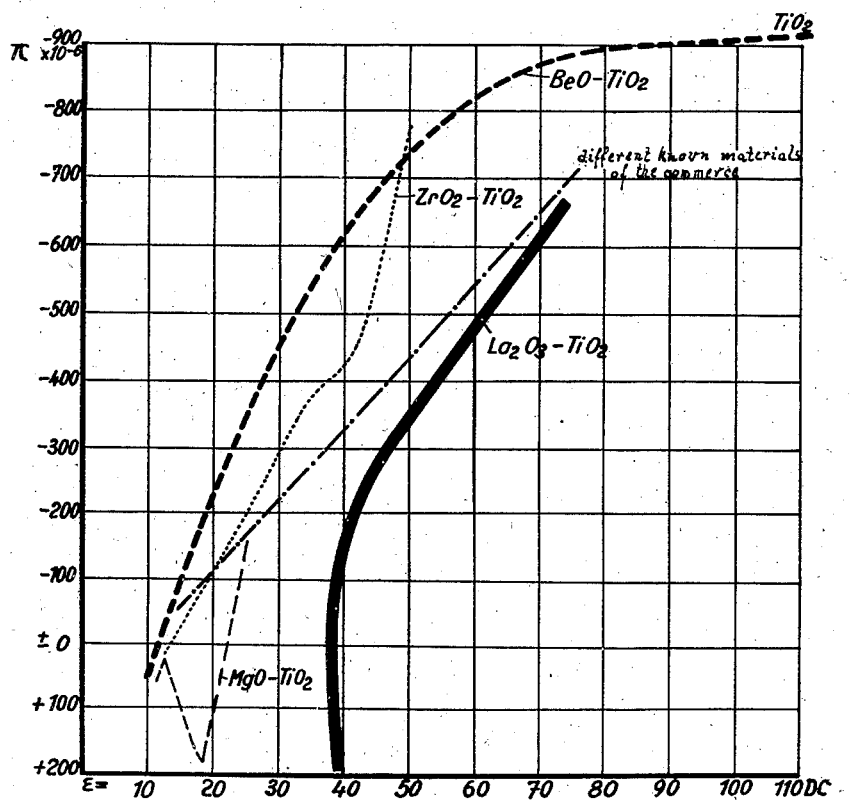

The diagram of Fig. 1 applies to materials containing in addition to titanium dioxide either the material known on the market as "Lanthanoxyd I" having the following composition:

| | Per cent |
|---|---|
| $La_2O_3$ | 64 to 68.50 |
| $CeO_2$ | 0.47 |
| $Nd_2O_3$ | 26 to 30 |
| $Pr_2O_3$ | 5.50 | or the material available on the German market under the name "crude Lanthanoxyd" containing 8–12 parts cerium oxide per 100 parts lanthanum oxide, or an oxide containing in 100 parts about 40 parts lanthanum oxide and 60 parts cerium oxide, or didymium oxide.

For a given proportion of titanium dioxide, the materials containing yttrium oxide referred to in the examples recited hereinbelow have a higher DC than the materials represented by the diagram of Fig. 1. I prefer for the manufacture of these materials to use a commercial product containing 75 per cent yttrium oxide. This product is superior to one containing 85 to 95 per cent yttrium oxide. Less favorable values than those of the diagram of Fig. 1 will be obtained with a product available on the German market as "Lanthanoxyd II." This product contains the smallest traces of $CeO_2$, of $Nd_2O_3$ and $Pr_2O_3$ and contains 90 per cent $La_2O_3$.

Fig. 2 is a diagram illustrating the temperature coefficients of the DC values of the materials dealt with in Fig. 1. At the same time Fig. 2 includes a diagram showing the corresponding data of some other known titanium dioxide containing materials such as the materials having an admixture of beryllium oxide, zirconium oxide and magnesium oxide. Also the data of some other commercial materials (except magnesium titanates) are shown, including the materials available on the market.

The above described new properties of my improved ceramic material containing titanium dioxide and lanthanum oxide render my invention particularly applicable to condensers and oscillating circuits including the same in which the capacity is to be either constant with fluctuation of the temperature or is to vary with such fluctuations in the opposite sense thereto within wide limits. The electrical data of a circuit containing a condenser having a positive TC may be rendered constant by inclusion in the circuit of one or more condensers made of my improved ceramic material having a negative temperature coefficient TC. By suitably combining condensers of the improved type having a negative TC with condensers having a positive TC, any desired resultant TC of the entire arrangement may be obtained. This resultant TC may be made negative if that is necessary for compensating a positive TC of other circuit elements such as inductance coils, thereby obtaining a circuit having a constant frequency independent of variations of the temperature.

My invention is of particular importance for the manufacture of condensers having a negligible TC of from $+150.10^{-6}$ to $-150.10^{-6}$. Condensers of this kind having a ceramic dielectric are not novel but the known dielectrics of this kind had invariably a comparatively low dielectric constant of from 6 to 18. The present invention has made it possible for the first time to secure a DC exceeding 18 combined with an extremely small TC, the DC attaining values of from 20 to 45. It is to be noted that the DC values of 20 to 45 are seen to be associated with TC values which are numerically small in Examples 3, 4 and 7, whereas they are large in Examples 1, 2 and 5. This is extremely favorable because it permits the dimensions of condensers for high frequency purposes, particularly short wave purposes, to be considerably reduced.

The technical advance attained by my improved materials is clearly illustrated by a comparison with the known magnesia-titanate materials having a similarly low angle of loss. These materials, though likewise of small dielectric losses, have a comparatively low DC, if at the same time the TC is to be maintained in the range of zero. The sintered ceramic masses containing titanium and lanthanum and possessing small dielectric losses may be provided with an elevated DC, while having also a somewhat elevated negative or positive TC.

The process of manufacture is the following: The components are mixed and then ground in wet condition from 25 to 30 hours within a rotary ball drum of porcelain, the balls consisting of flint. The mixture is then dried and moulded in the manner customary in the ceramic industry, for instance by the customary dry pressing process. The bodies so produced are then burned in the customary manner at a temperature of Seger Cone (SC) 10 to 15. The period of time within which the final temperature should be reached, may be different depending on the bodies to be produced. With bodies of small dimensions the temperature may be raised to the final limit within 1 to 10 hours. With bodies of larger dimensions, however, this period is preferably chosen from 20 to 25 hours. The final temperature is maintained from 1 to 5 hours, the exact burning time being determined in each case by simple experiment as usual in the ceramic art. After the bodies have been allowed to cool, the opposite coating carrier faces thereof are—in a manner known per se—coated with a liquid rare metal compound, for instance burnishing silver and are subjected to a burning temperature of from 500 to 800 centigrade. In this operation firmly adhering coatings of metal are formed. The condensers so produced are particularly adapted for use in electrical oscillating circuits.

I shall now set forth a number of examples for my improved materials. In referring to "Lanthanoxyd I" or "Lanthanoxyd II" I mean the materials having the composition described hereinabove:

(1) Lanthanoxyd II _____ 18 per cent
    Titanium dioxide _____ 82 per cent
                                     _____
                                     100 per cent Burning temperature _____ SC 14 collapsed to SC 14 bent
Dielectric constant _____ 67
Angle of loss _____ tan $d=2.10^{-4}$
Temperature coefficient _____ TC$=-590.10^{-6}$ (2) Lanthanoxyd I _____ 16.6 per cent
    Titanium dioxide _____ 83.4 per cent
                                   _____
                                   100 per cent Burning temperature _____ SC 13 collapsed to SC 14 bent
Dielectric constant _____ 82
Angle of loss _____ tan $d=9.10^{-4}$
Temperature coefficient _____ TC$=-815.10^{-6}$ (3) Lanthanoxyd I _____ 41.3 per cent
    Titanium dioxide _____ 58.7 per cent
                                   _____
                                   100 per cent Burning temperature _____ SC 13 collapsed to SC 14 bent
Dielectric constant _____ 45
Angle of loss _____ tan $d=2.10^{-4}$
Temperature coefficient _____ TC$=-275.10^{-6}$ (4) Lanthanoxyd I _____ 62.2 per cent
    Titanium dioxide _____ 37.8 per cent
                                   _____
                                   100 per cent Burning temperature _____ SC 13 collapsed to SC 14 bent
Dielectric constant _____ 40
Angle of loss _____ tan $d=1.10^{-4}$ to $2.10^{-4}$
Temperature coefficient _____ TC$=0$ to $-50.10^{-6}$ (5) Yttrium oxide of 75 per cent
    content _____ 54.6 per cent
    Titanium dioxide _____ 45.4 per cent
                                  _____
                                  [1] 100 per cent Burning temperature _____ SC 14 nearly bent
Dielectric constant _____ 64–70
Angle of loss _____ tan $d=3.5.10^{-4}$ to $5.5.10^{-4}$
Temperature coefficient _____ TC$=-600.10^{-6}$ (6) Yttrium oxide of 75 per cent
    content _____ 44.6 per cent
    Titanium dioxide _____ 55.4 per cent
                                  _____
                                  [2] 100 per cent Burning temperature _____ SC 13–14
Dielectric constant _____ 71–75
Angle of loss _____ tan $d=9.10^{-4}$ to $12.10^{-4}$ (7) Didymium oxide _____ 51.8 per cent
    Titanium dioxide _____ 48.2 per cent
                                  _____
                                  100 per cent Burning temperature _____ SC 13–14
Dielectric constant _____ 36–41
Angle of loss _____ tan $d=3.10^{-4}$ to $4.10^{-4}$
Temperature coefficient _____ TC$=-20.10^{-6}$ (8) $TiO_2$ _____ 30 to 55 per cent
    Clay _____ 0 to 5 per cent
    and a mixture of _____ $La_2O_3+Nd_2O_3+Pr_2O_3$
    Dielectric constant _____ 35–40
    Temperature coefficient ___ $-150.10^{-6}$ to $150.10^{-6}$ (9) $TiO_2$ _____ 38–75

[1] The proportion by weight of yttrium oxide to titanium dioxide being about 41:45.4.
[2] The proportion by weight of yttrium oxide to titanium dioxide being about 33.4:55.4.

Electrical dielectric of sintered ceramic material containing $TiO_2$ and from 38 to 75 per cent of oxides of lanthanum, neodymium and praseodymium said latter oxides being present in the same relative proportions to each other as in monazite sand.

As stated heretofore, the lanthanum oxide is preferably used together with the naturally accompanying earths contained in the Cerite- and monazite minerals, for instance in form of the raw or commercially pure lanthanum oxide having 60 to 90 per cent $La_2O_3$ obtained when monazite sand is worked up. The titanium dioxide must be a product free from alkali and iron in order to obtain a low angle of loss. It may be pure rutile or a material produced by precipitation from a watery solution available on the German market.

The data following hereinafter will clearly illustrate the superiority of my improved materials. These data give the range of dielectric constants of such materials which have dielectric properties independent of temperature, i. e. TC$=0$ and the dielectric constants of such materials where the temperature coefficient is small but negative.

BeO—$TiO_2$—materials _____ DC$=10$–11   14–15
$ZrO_2$—$TiO_2$—materials _____         13–15   18–21
$La_2O_3$—$TiO_2$—materials _____        34–41   36–41

What I claim is:
1. A dielectric for electrical condensers comprising a shaped and sintered ceramic mass com- prising titanium dioxide and an effective amount of a commercial product containing 75 per cent yttrium oxide.

2. A dielectric for electrical condensers comprising a shaped and sintered ceramic mass comprising about 45.4 to 55.4 parts by weight of titanium dioxide to about 41 to 33.4 parts of yttrium oxide.

WERNER RATH.

REFERENCES CITED

The following references are of record in the file of this patent:

UNITED STATES PATENTS

| Number | Name | Date |
|---|---|---|
| 1,479,315 | Pickard | Jan. 1, 1924 |
| 2,065,921 | Gerth | Dec. 29, 1936 |
| 2,069,903 | Soyck | Feb. 9, 1937 |
| Re. 21,175 | Morey | Aug. 15, 1939 |
| 2,150,694 | Morey | Mar. 14, 1939 |
| 2,259,138 | Inutsuka | Oct. 14, 1941 |
| 2,220,775 | Navias | Nov. 5, 1940 |
| 2,220,774 | Navias | Nov. 5, 1940 |
| 2,098,812 | Pulfrich | Nov. 9, 1937 |
| 2,235,489 | Rath | Mar. 18, 1941 |
| 2,226,299 | Albers-Schonberg | Dec. 24, 1940 |
| 2,398,088 | Ehlers | Apr. 9, 1946 |